US011995233B2

(12) United States Patent
Yang

(10) Patent No.: US 11,995,233 B2
(45) Date of Patent: May 28, 2024

(54) BIOMETRIC FEEDBACK CAPTURED DURING VIEWING OF DISPLAYED CONTENT

(71) Applicant: Sony Interactive Entertainment LLC, San Mateo, CA (US)

(72) Inventor: Yiwei Yang, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 259 days.

(21) Appl. No.: 17/507,680

(22) Filed: Oct. 21, 2021

(65) Prior Publication Data

US 2023/0129718 A1    Apr. 27, 2023

(51) Int. Cl.
| G06F 3/01 | (2006.01) |
| A63F 13/213 | (2014.01) |
| A63F 13/537 | (2014.01) |
| A63F 13/55 | (2014.01) |
| G06F 3/0482 | (2013.01) |
| G06F 3/04845 | (2022.01) |

(52) U.S. Cl.
CPC ............ G06F 3/015 (2013.01); A63F 13/213 (2014.09); A63F 13/537 (2014.09); A63F 13/55 (2014.09); G06F 3/013 (2013.01); G06F 3/017 (2013.01); G06F 3/0482 (2013.01); G06F 3/04845 (2013.01); A63F 2300/8082 (2013.01)

(58) Field of Classification Search
CPC .......... G06F 3/015; G06F 3/013; G06F 3/017; G06F 3/0482; G06F 3/04845; A63F 13/213; A63F 13/537; A63F 13/55; A63F 2300/8082
See application file for complete search history.

(56) References Cited

U.S. PATENT DOCUMENTS

| 2012/0257035 A1* | 10/2012 | Larsen | G06F 3/017 348/78 |
| 2017/0249009 A1* | 8/2017 | Parshionikar | G06F 3/017 |
| 2018/0239430 A1* | 8/2018 | Tadi | G06F 3/015 |
| 2019/0387998 A1* | 12/2019 | Garten | A61B 5/165 |
| 2020/0097076 A1* | 3/2020 | Alcaide | G06F 3/012 |
| 2020/0121195 A1* | 4/2020 | Bresler | A61B 3/112 |
| 2020/0121235 A1* | 4/2020 | Gibbons | G16H 40/63 |
| 2020/0307437 A1* | 10/2020 | Thieberger | B60P 3/073 |
| 2020/0364453 A1* | 11/2020 | Tonsen | A61B 5/163 |
| 2021/0223864 A1* | 7/2021 | Forsland | G06F 1/163 |
| 2021/0393180 A1* | 12/2021 | Vallejo | A61B 5/742 |
| 2022/0238220 A1* | 7/2022 | Konrad | A61B 5/6803 |

* cited by examiner

Primary Examiner — Malina D. Blaise
(74) Attorney, Agent, or Firm — Penilla IP, APC

(57) ABSTRACT

A method is provided, including: rendering a view of a virtual environment through a virtual reality (VR) headset; detecting a gaze direction of a user that wears the VR headset; detecting a gaze focus depth of the user that wears the VR headset; detecting an electroencephalography (EEG) signal of the user that wears the VR headset; using the gaze direction and gaze focus depth of the user to identify a virtual object in the virtual environment as being actively viewed by the user; using the EEG signal to determine a concentration of the user upon the identified virtual object; responsive to determining the concentration of the user upon the identified virtual object, then rendering a graphical indicator applied to the virtual object in the view of the virtual environment.

12 Claims, 6 Drawing Sheets

BIOMETRIC FEEDBACK CAPTURED DURING VIEWING OF DISPLAYED CONTENT

FIELD OF THE DISCLOSURE

Implementations of the present disclosure relate to methods and systems for capturing biofeedback while a user is looking at an object.

BACKGROUND

Description of the Related Art

Head-mounted displays are capable of providing immersive viewing of virtual reality environments. However, interactions with virtual objects in virtual reality environments continue to be reliant on existing interface mechanisms and schemas, which are largely derived from existing video game interface implementations.

It is in this context that implementations of the disclosure arise.

SUMMARY OF THE DISCLOSURE

Implementations of the disclosure are drawn to methods and systems for capturing biofeedback while a user is looking at an object.

In some implementations, a method is provided, including: rendering a view of a virtual environment through a virtual reality (VR) headset; detecting a gaze direction of a user that wears the VR headset; detecting a gaze focus depth of the user that wears the VR headset; detecting an electroencephalography (EEG) signal of the user that wears the VR headset; using the gaze direction and gaze focus depth of the user to identify a virtual object in the virtual environment as being actively viewed by the user; using the EEG signal to determine a concentration of the user upon the identified virtual object; responsive to determining the concentration of the user upon the identified virtual object, then rendering a graphical indicator applied to the virtual object in the view of the virtual environment.

In some implementations, using the EEG signal to determine the concentration of the user includes applying a trained machine learning model to recognize the EEG signal, the trained machine learning model being trained using prior EEG signal data of the user.

In some implementations, the graphical indicator is configured to indicate selection of the identified virtual object.

In some implementations, the graphical indicator is configured to include a menu of options to be applied to the virtual object.

In some implementations, the method further includes: receiving controller input through a controller device held by the user, and applying said controller input to effect a change in the virtual object.

In some implementations, the change in the virtual object is defined by a movement of the virtual object.

In some implementations, the method further includes: receiving gesture input of the user, and applying said gesture input to effect a change in the virtual object.

In some implementations, the virtual environment is a virtual environment of a video game, and wherein the virtual object is a virtual object of the video game.

In some implementations, detecting the EEG signal uses an EEG sensor included in the VR headset.

In some implementations, detecting the gaze direction or the gaze focus depth of the user uses a camera included in the VR headset.

In some implementations, a non-transitory computer readable medium is provided, having program instructions embodied thereon that, when executed by at least one computing device, cause said at least one computing device to perform a method, said method comprising: rendering a view of a virtual environment through a virtual reality (VR) headset; detecting a gaze direction of a user that wears the VR headset; detecting a gaze focus depth of the user that wears the VR headset; detecting an electroencephalography (EEG) signal of the user that wears the VR headset; using the gaze direction and gaze focus depth of the user to identify a virtual object in the virtual environment as being actively viewed by the user; using the EEG signal to determine a concentration of the user upon the identified virtual object; responsive to determining the concentration of the user upon the identified virtual object, then rendering a graphical indicator applied to the virtual object in the view of the virtual environment.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Broadly speaking, implementations of the present disclosure are drawn to methods and systems for capturing biofeedback while a user is looking at an object. In some implementations the object is a virtual object in a virtual environment rendered for viewing by the user, whereas in other implementations the object is a real object in the user's local environment. The concentration or focus of attention of the user upon the object is determined based on gaze tracking of the user's eyes as well as electroencephalography (EEG) input indicative of the user's brain activity. These inputs can be analyzed in combination And may be used to trigger selection of the object or other types of actions. In some implementations, additional actions performed on the object can be triggered through controller input or user gestures.

Figure 1:
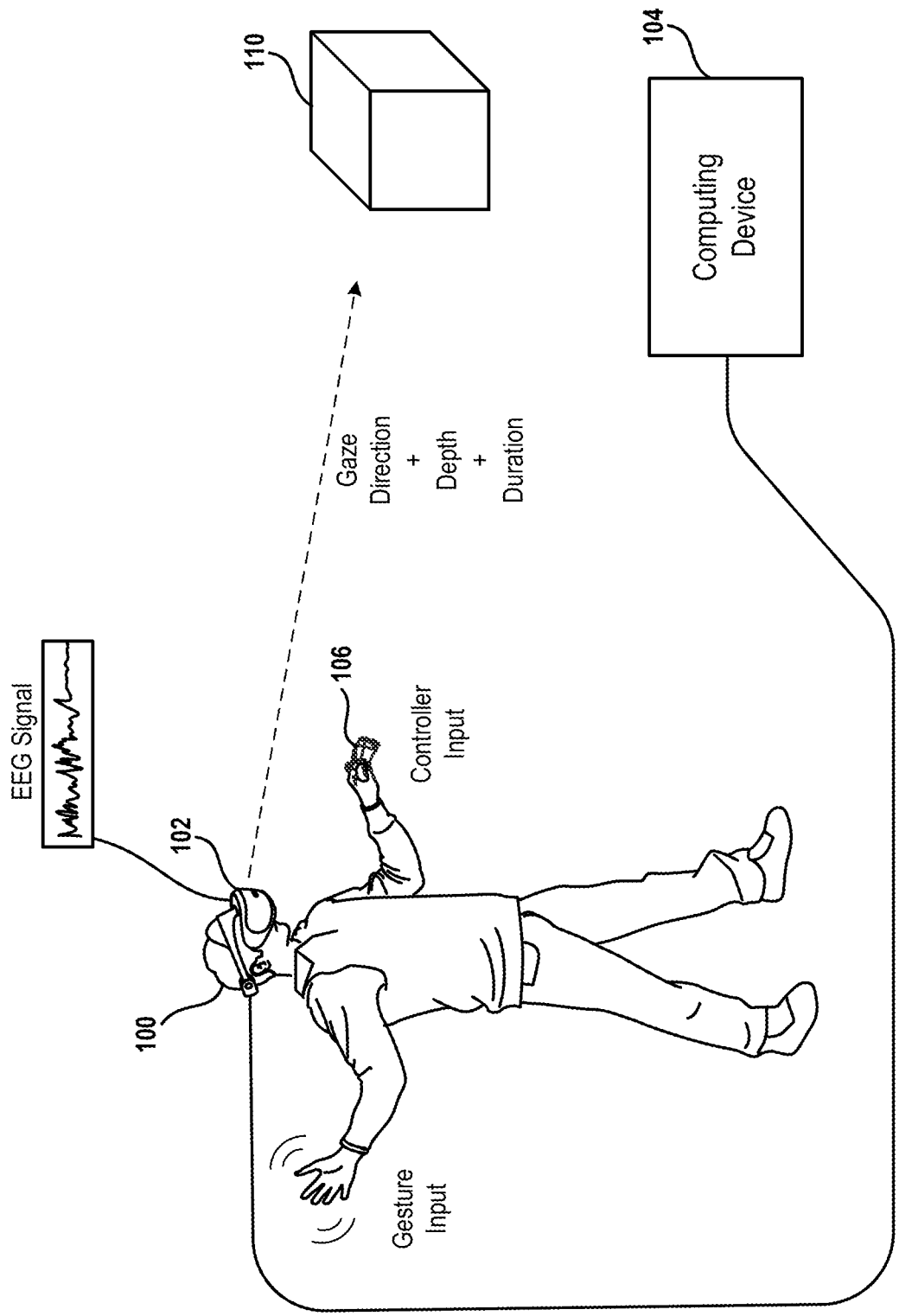
FIG. 1 conceptually illustrates a system for enabling concentration based activity upon a virtual object, in accordance with implementations of the disclosure.

FIG. 1 conceptually illustrates a system for enabling concentration based activity upon a virtual object, in accordance with implementations of the disclosure. In the illustrative implementation, a user 100 wears a head-mounted display (HMD) 102. In some implementations the head-mounted display 102 is a virtual reality headset, through which a view of a virtual environment is rendered for viewing by the user 100. The HMD 102 can be operatively connected (wired or wireless) to a computing device 104, which in some implementations provides processing and execution of a computer program to render the virtual environment. By way of example without limitation, the computing device 104 can be any general or special purpose computer, a game console, or other device capable of rendering image frames providing a view of the virtual environment for presentation on the head-mounted display 102. It will be appreciated that in some implementations, the functionality of the computing device 104 can be integrated within the HMD 102.

In other implementations, the head-mounted display 102 is a mixed reality headset enabling viewing of the real local environment through the HMD along with virtual elements/objects inserted into the context of the local environment. In still other implementations, the head-mounted display 102 is an augmented reality headset, which can also provide viewing through the HMD of the local environment, with overlaid information provided in relation to real objects in the user's view.

With continued reference to FIG. 1, gaze tracking of the user's eyes is provided. That is, a gaze direction and gaze depth of focus are tracked. In some implementations, gaze tracking is enabled through one or more cameras within the head-mounted display 102 that capture images of the user's eyes. In some implementations, gaze depth of focus is determined by triangulation based on the individual gaze directions of each of the user's eyes. In other implementations, the gaze depth of focus is determined using specialized sensors (in the HMD 102) capable of determining and tracking the thickness or focal state of the lenses of the user's eyes.

While gaze tracking can be utilized to determine what a given user is looking at, this may not be indicative of whether or not the user is actually concentrating on a given object that he or she happens to be looking at. For example, in the illustrated implementation, the gaze direction and gaze depth of the user 100 are directed at an object 110. However, while the user's gaze can be determined to be aimed at the object 110, the user may or may not be concentrating on the object 110. Therefore, in accordance with implementations of the present disclosure, brain activity of the user is also detected and utilized to determine the concentration of the user in relation to a given object.

More specifically, electroencephalography (EEG) systems can be included in the head-mounted display 102 in order to monitor the brain activity of the user. In some implementations, a plurality/array of EEG electrodes is included in the HMD 102, such as along the interior surfaces of the display housing, the band of the HMD 102, or along other surfaces of the HMD 102 that touch the user's skin when the HMD is worn. The output from the EEG electrodes is processed into an EEG signal, which is analyzed to determine the brain state of the user 100, in accordance with implementations of the disclosure.

In some implementations, the EEG signal is used to determine whether the user is concentrating on or focused on a given object, such as the object 110 in the illustrated implementation. Broadly speaking, a recognition process such as a trained machine learning model can be applied to the EEG signal to recognize the concentration state of the user's mind. In some implementations, the recognition process is configured to distinguish between whether the user is actively focused or concentrating on the object 110, or not actively focused or concentrating on the object. That is, the recognition process is capable of identifying based on the EEG signal a concentrating state or a non-concentrating state of the user's mind. And this in combination with the user's determined gaze attributes can be used to determine that the user 100 is actively looking at and concentrating on the object 110.

In some implementations, the user's gaze attributes, such as the gaze direction, gaze depth, and duration of focus at a given location/region, along with the EEG signal, are considered together as factors in totality to determine whether or not the user is focused or concentrating on the object 110.

Various types of activity can be triggered in response to determining that the user is concentrating on the object 110. In some implementations, an active selection state is triggered such that the object 110 is actively selected for enablement or performance of some additional action. For example, the object 110 may be a virtual object and selection of the virtual object enables movement of the virtual object, such as in response to controller input via a controller device 106 as shown in the illustrated embodiment. For example, the controller device 106 may include a joystick and movement of the joystick causes the virtual object to move.

In some implementations, gesture input can be detected and applied to effect movement of the selected virtual object, such as translational and/or rotational movement in some implementations. It will be appreciated that gestures of the user 100 can be recognized using an external camera or an externally facing camera of the HMD 102. This can provide an intuitive interface whereby the user is able to look at and concentrate on a virtual object, and then cause it to move by waving their hand, for example. In still other implementations, movement of the selected virtual object can be effected by shifting the user's gaze, thereby providing an effect of telekinesis.

It will be appreciated that in various other implementations, other kinds of actions can be performed on the virtual object after it is selected as described above. By way of example without limitation, such actions can include obtaining the object into a personal inventory such as an inventory of a character/entity in a video game, destroying or removing the object, changing a visual attribute of the object, causing the object to change or evolve, shrinking the object, enlarging the object, shooting at or firing a weapon aimed towards the object, etc.

As noted above, and some implementations the object 110 can be a real object in the user's real local environment. It will be appreciated that in such implementations, the HMD 102 can be a mixed reality headset or an augmented reality headset. Accordingly, when the real object is selected as described above based on the user's gaze activity and brain activity, then mixed reality virtual renderings or augmented renderings can be triggered via controller input or detected user gestures. For example, in some implementations, rendering of information related to the selected object is triggered in response to the selection of the object.

In still other implementations, other types of interactions can be triggered based on the user's concentration/focus at a given object or location. For example, in some implementations, the user may teleport to a virtual location in a virtual environment, either in response to some input following determination that the user is concentrating on the virtual location or an object proximate to the virtual location, or directly in response to said concentration determination.

In some implementations, actions upon virtual objects or teleportation as described above can be used in the context of a video game. For example, in some implementations, a user may be or control a character in a video game, and the character may have super powers such as telekinesis or teleportation. Accordingly, such super powers can be controlled by the user in accordance with implementations as described herein.

In some implementations, additional biometric inputs can be used in combination with the inputs described above. For example, galvanic skin sensor(s) can be included in controller device 106 at locations in the controller handle where the user touches the controller device. Such galvanic skin sensors can detect and measure the user's skin conductivity level to enable determination of the user's stress level, such as indicating how excited or calm the user is feeling. This can also be indicative of the user's concentration level, and indicate how challenged or bored the user might be feeling.

In some implementations, gaming content of a video game can be adapted to the user's emotional state. For example, the difficulty level of the video game can be increased if it is determined that the user is bored or losing concentration, such by adding extra challenges. Conversely, the difficulty level of the video game could be reduced if it is determined that the user is overly challenged or too stressed.

A challenge in obtaining biometric feedback is understanding the meaning of signals for a given individual. Each user may have their own distinctive EEG signature, and therefore a calibration process can be implemented to enable the systems to understand what a given signal means for a given specific user. In some implementations, a machine learning model is implemented and trained to identify/classify the meaning of EEG signals for a given user.

In some implementations, a tutorial or training lesson is provided to enable a user to learn how to focus/concentrate, and to enable training of a recognition process (such as a machine learning model) to identify the user's EEG signals. This simultaneously allows the user and the recognition process to be calibrated so that the accuracy of recognition of the user's EEG signals can be improved.

Figure 2:
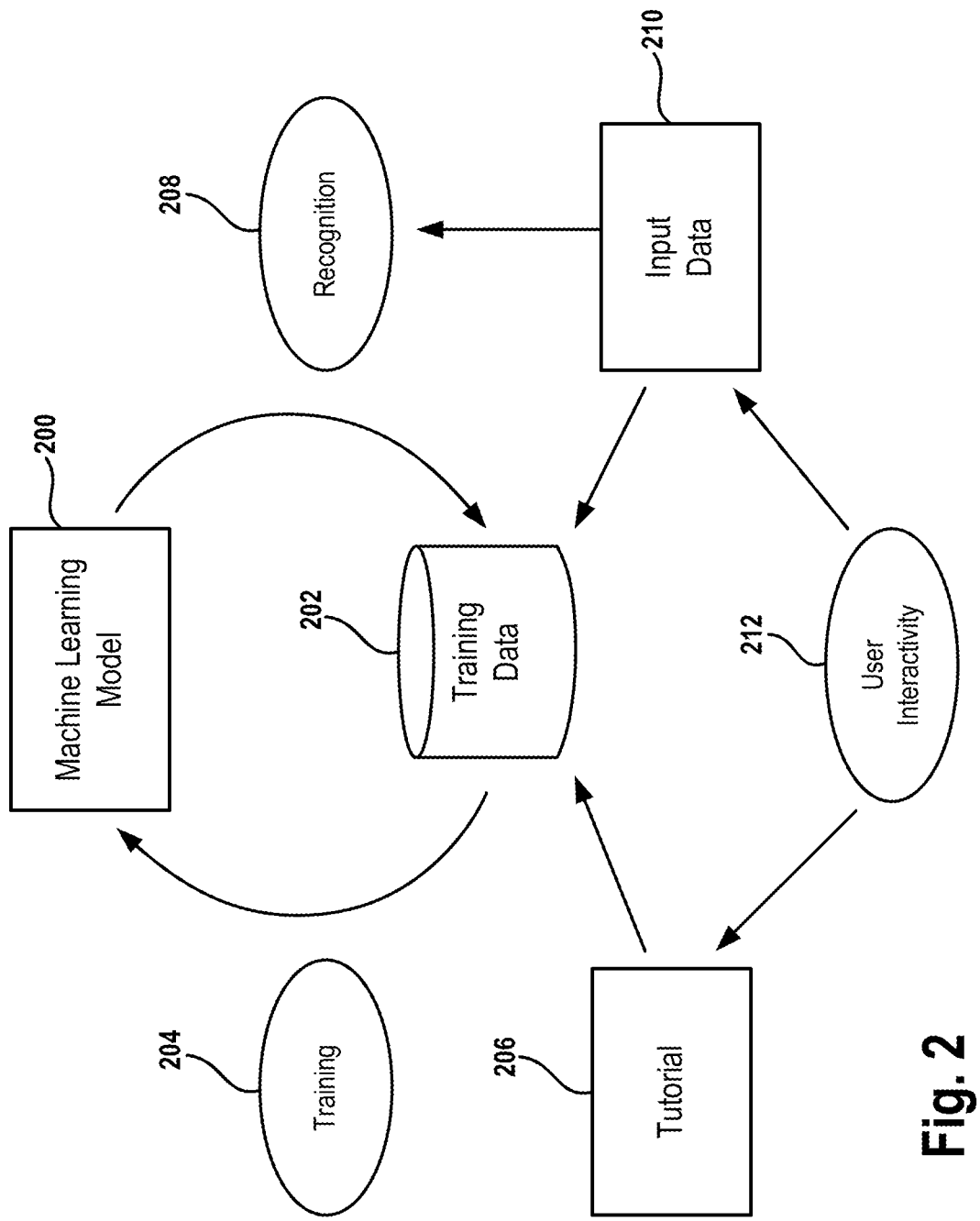
FIG. 2 conceptually illustrates implementation of a machine learning model for understanding and recognizing concentration of the user upon an object, in accordance with implementations of the disclosure.

FIG. 2 conceptually illustrates implementation of a machine learning model for understanding and recognizing concentration of the user upon an object, in accordance with implementations of the disclosure. In the illustrated implementation, a machine learning model 200 is provided. The machine learning model 200 undergoes a training process 204 using training data 202. In some implementations, the training data 202 can include data initially provided through a tutorial 206 for the user. For example, the tutorial 206 can be implemented as part of a video game or other interactive program, as part of an initial set-up phase. During the tutorial 206, user interactivity 212 with predefined scenarios can be measured, thereby generating initial data that is specific to the user and which is used to train the machine learning model 200 in order to customize/personalize the machine learning model to the specific user. That is, the machine learning model is trained so as to specifically recognize the inputs of the user and determine whether and to what extent the user is concentrating or focused on a given object or location.

In some implementations, this customization process results in generation of user specific settings for the machine learning model that are stored in association with the user's account. The user specific settings can be retrieved and applied to the machine learning model for use when the user engages in interactive use of the system at a later time.

After the machine learning model 200 has been appropriately trained, and possibly customized to the user, then the trained machine learning model can be applied to recognize the concentration state of the user based on user input data 210 generated through the user's interactivity 212, for example, during gameplay of a video game or some other interactive application. In some implementations, the input data includes gaze tracking data and/or EEG data as has been described. In some implementations, the input data can further include other types of input data such as controller inputs, gesture inputs, motion sensing device input, biometric input (e.g. galvanic skin resistance), etc. It will be appreciated that in some implementations, the input data can further be added to the training data 202 and used to further train the machine learning model 200.

In some implementations, the interactive application is configured to enable implicit or explicit feedback regarding whether the recognition performed by the machine learning model 200 was accurate. For example, if selection of an object in response to a determination of concentration on an object is implemented as previously described, then if the user proceeds to perform an associated action following the selection, then this can be interpreted as a positive feedback that the recognition by the machine learning model was accurate. However, if the user does not take an associated action following the selection, or cancels the selection, then this can be interpreted as negative feedback indicating that the recognition by the machine learning model was not accurate. Such feedback can be incorporated into the training data 202 along with the input data 210 to enable improved recognition by the machine learning model 200.

As has been noted, tutorials or training lessons can be constructed for users to learn and acquire the ability to provide recognizable EEG input which can be utilized as described in the various implementations herein. Such tutorials also provide signals which are useful for training the system to recognize the signals of a particular user.

Figure 3:
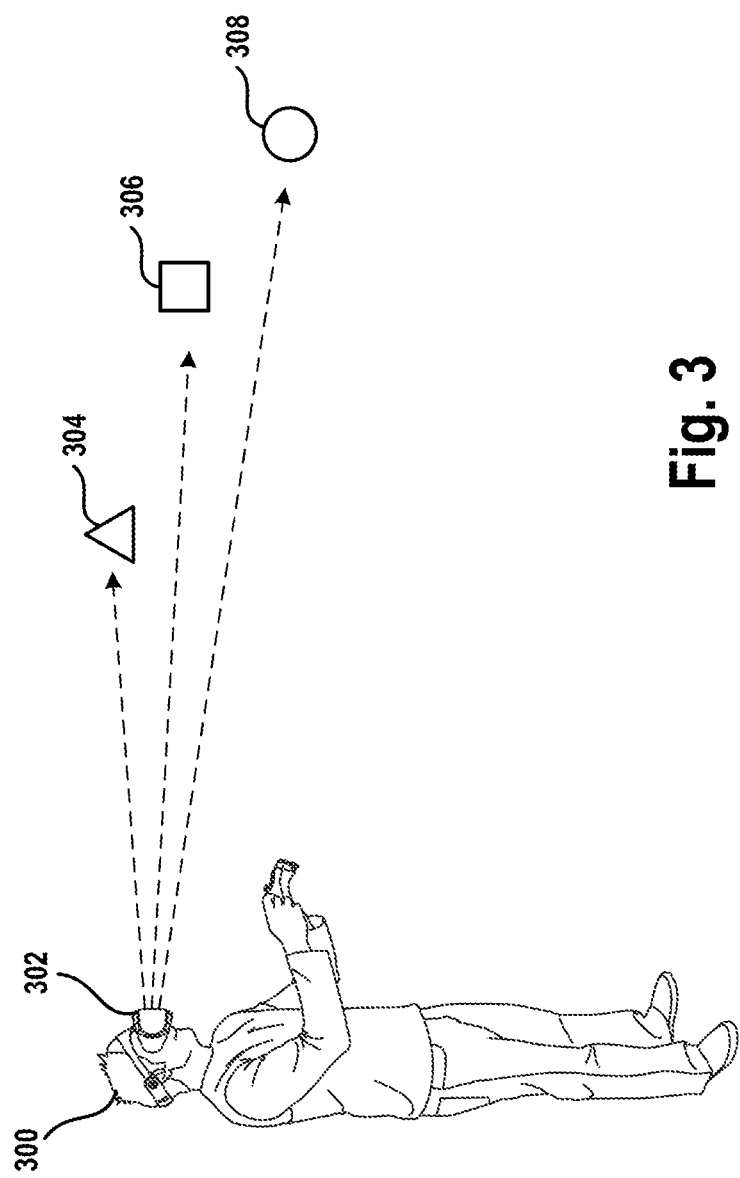
FIG. 3 conceptually illustrates a user engaging in a tutorial for learning or practicing concentrating on an object, in accordance with implementations of the disclosure.

FIG. 3 conceptually illustrates a user engaging in a tutorial for learning or practicing concentrating on an object, in accordance with implementations of the disclosure. In the illustrated implementation, a user 300 views virtual objects through an HMD 302. In some implementations, the tutorial presents virtual objects 304, 306, and 308 for viewing by the user. The user can be instructed to look at a given object and concentrate on the object for a specified time period, and may also be instructed to not look at the object for a specified time period. In some implementations, the user is instructed to look at and concentrate on the multiple objects in a sequential, predefined order. In some implementations, the objects can have different shapes (e.g. triangle, square, circle, etc.) or other characteristics such as color, size, etc. In some implementations, the objects are placed at different depths or at predefined locations for viewing. In some implementations, the tutorial may have the user practice performing actions, such as concentrating on an object and then making a hand gesture to effect movement of the object. In some implementations, objects placed at different depths can be utilized, and the user may be instructed to look at and concentrate on the objects.

It will be appreciated that as the user is instructed to look at and concentrate on (or not look at) a given object, the user's gaze activity and EEG activity is tracked and recorded, and further used to train the machine learning model to recognize the signals for the given user. Also, such a tutorial enables the user to practice and learn how to concentrate/focus in a manner that is recognizable to the system. Thus, during such a tutorial, both the user and the system are being adapted to each other.

Figure 4:
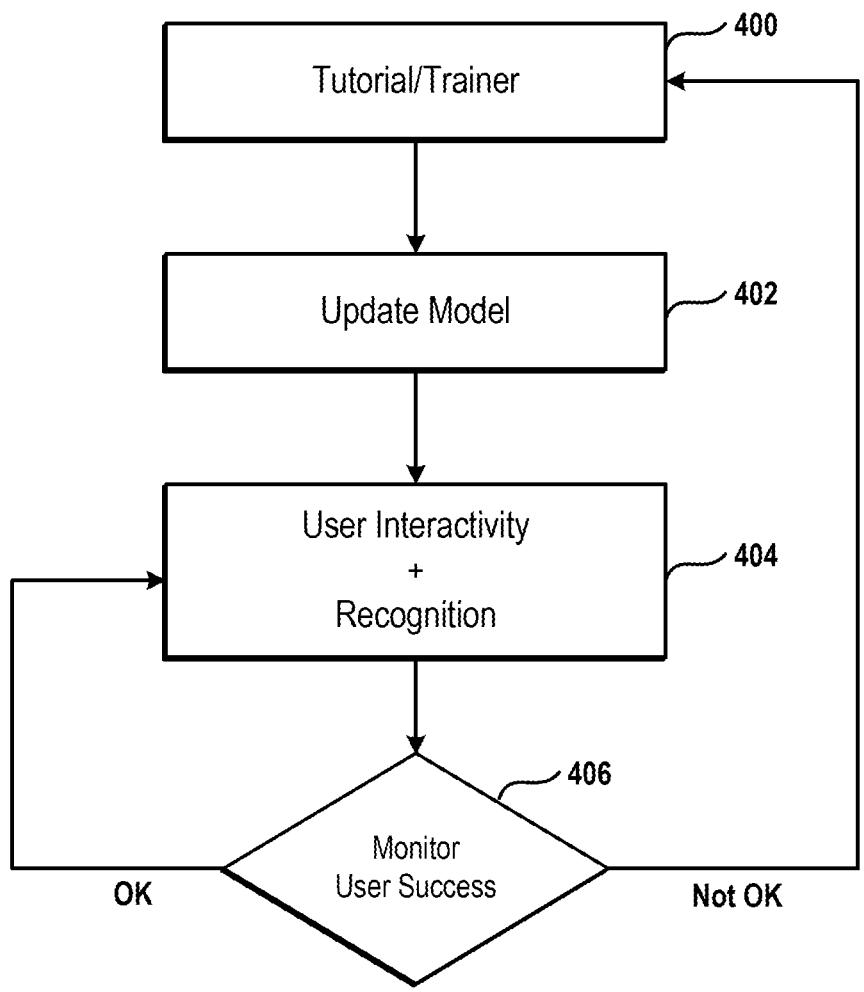
FIG. 4 conceptually illustrates a method for providing dynamic trainers during gameplay of a video game, in accordance with implementations of the disclosure.

FIG. 4 conceptually illustrates a method for providing dynamic trainers during gameplay of a video game, in accordance with implementations of the disclosure. At method operation 400, a tutorial or trainer routine is provided to the user, such as that described above, which enables the user to practice and learn how to concentrate in a recognizable fashion for the system. As the machine learning model for the user can also be adapted to the user, then at method operation 402, the machine learning model can be updated/trained based on data obtained from the most recent tutorial. At method operation 404, the currently trained machine learning model is then applied during user interactivity, such as that occurring during a video game, to recognize when the user is concentrating on a given object or location.

At method operation 406, the user's success in carrying out concentration related tasks is monitored. For example, during a video game at a given location or stage in the video game, the user may be tasked with performing a concentration related task such as looking and focusing on an object and causing it to move in a certain manner. The system monitoring the user may determine whether or not the user is succeeding in performing the task. If the user is succeeding in performing such tasks, then the method returns to operation 404 as user interactivity and concomitant recognition by the machine learning model continues to be carried out.

However, if it is determined that the user is not succeeding or struggling in performing such tasks, then a suggestion may be provided to the user to undergo a training module or tutorial. And if the user accepts the suggestion, then the method returns to operation 400 whereupon a tutorial or training module is provided to the user. Accordingly, the user is trained in a manner so as to improve the user's ability to provide recognizable concentration brainwave states, and also improve the ability of the machine learning model to recognize the individual user's brain waves. Thus, a dynamically available trainer module can be surfaced to the user in response to the user's determined level of success in performing concentration based tasks.

While implementations of the present disclosure have generally be described with reference to virtual objects being the subjects of focus and concentration by the user, in other implementations, the techniques described herein can also be applied to real objects in a real-world environment. That is, the user's focus and concentration on a real object or a real location can be determined and tracked. In some implementations, the objects can be real objects which are part of a mixed reality space, in which virtual objects are also presented in the context of the real-world environment.

In some implementations, to enable detection of real-world objects in the local environment, data from externally facing depth sensors included in the HMD are used, in addition to image capture data from cameras of the HMD. Examples of depth sensors include z-cam, lidar, proximity sensors, etc. This can provide a more socially acceptable way to select real-world objects or control mixed reality overlays. For example, the user may use a small handheld controller to provide inputs, with selection of real-world objects being performed through gaze tracking and EEG tracking as described above.

In some implementations, the time threshold for determining whether a user has concentrated or focused on an object may be different for different objects. For example, some objects such as a monster in a video game may be appreciated within a relatively short amount of time. Whereas an object such as a restaurant menu may require a relatively long amount of time. Thus, different objects may have different concentration thresholds in terms of the amount of time of focused attention required to determine that the user is focused on a given object.

Figure 5:
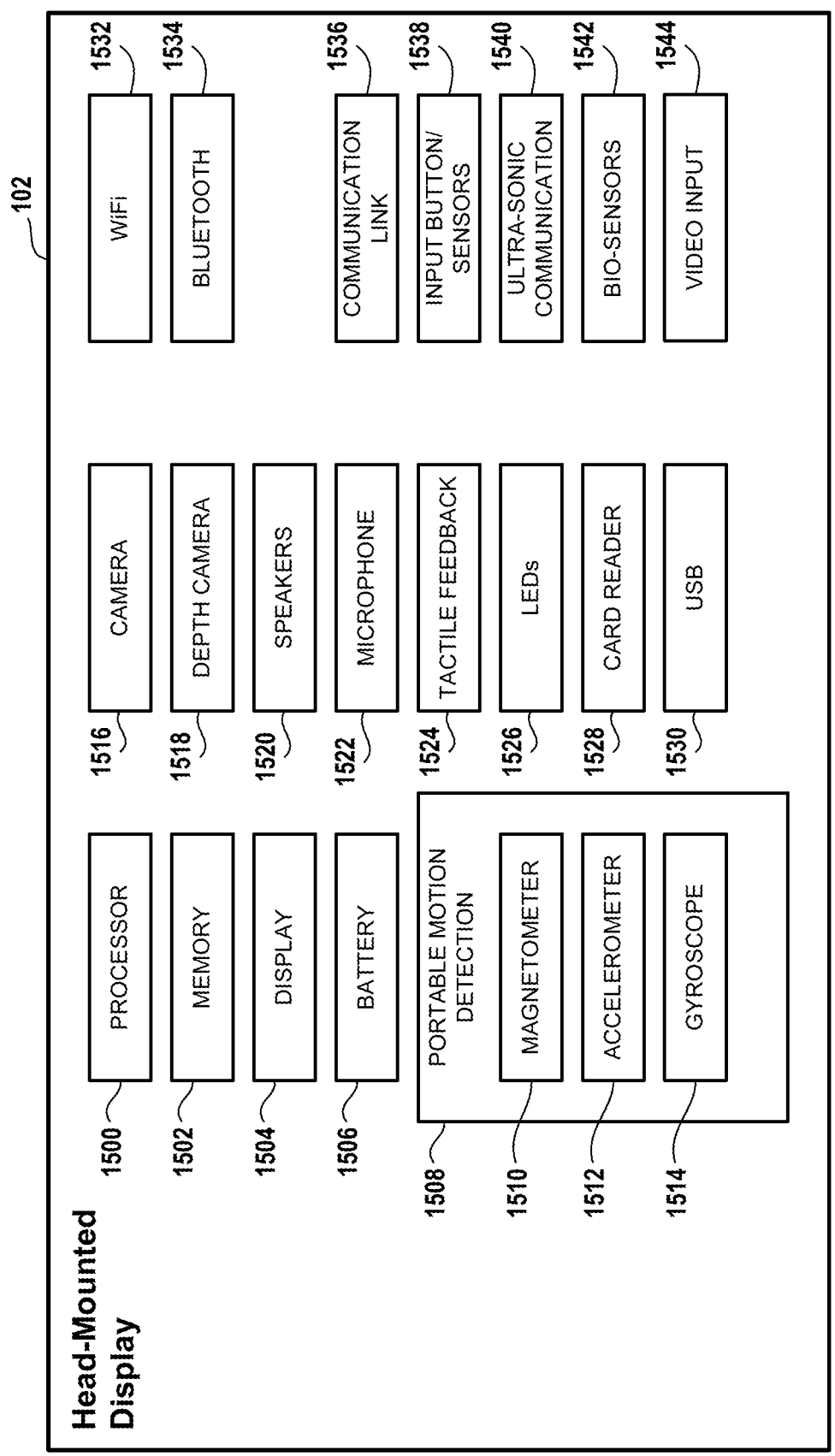
FIG. 5 is a diagram illustrating components of a head-mounted display (HMD), in accordance with an implementation of the disclosure.

With reference to FIG. 5, a diagram illustrating components of a HMD 102 is shown, in accordance with implementations of the disclosure. In some implementations, the HMD is in the form factor of glasses, goggles, a helmet, headset or other types of form factors that enable secure attachment to the user to enable viewing. The HMD 102 includes a processor 1500 for executing program instructions. A memory 1502 is provided for storage purposes, and may include both volatile and non-volatile memory. A display 1504 is included which enables presentation of virtual reality, augmented reality, or mixed reality content for viewing by the user. In some implementations, the display 1504 is an LCD, LED, or OLED display. In some implementations for providing mixed/augmented reality viewing, the display is an optical see-through display which enables physical viewing through a substantially transparent display to see the local environment, while also providing for rendering of content in the user's view. Whereas in other implementations, the display is a video see-through display, in which the user does not physically see through the display, but in which captured video of the real environment is rendered on the display in real-time with virtual elements being added. A battery 1506 is provided as a power source for the HMD 102. A motion detection module 1508 may include any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1512 are used to provide the direction of gravity, which gives an absolute reference for two angles (world-space pitch and world-space roll).

A magnetometer measures the strength and direction of the magnetic field in the vicinity of the HMD. In one implementation, three magnetometers 1510 are used within the HMD, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1512 is used together with magnetometer 1510 to obtain the inclination and azimuth of the HMD 102.

In some implementations, the magnetometers of the HMD are configured so as to be read during times when electromagnets in other nearby devices are inactive.

A gyroscope is a device for measuring or maintaining orientation, based on the principles of angular momentum. In one implementation, three gyroscopes 1514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1516 is provided for capturing images and image streams of a real environment. More than one camera may be included in the HMD 102, including a camera that is outward-facing (directed away from a user when the user is viewing the display of the HMD 102), and a camera that is inward-facing (directed towards the user when the user is viewing the display of the HMD 102). Additionally, a depth camera 1518 may be included in the HMD 102 for sensing depth information of objects in a real environment.

The HMD 102 includes speakers 1520 for providing audio output. Also, a microphone 1522 may be included for capturing audio from the real environment, including sounds from the ambient environment, speech made by the user, etc. The HMD 102 includes tactile feedback module 1524 for providing tactile feedback to the user. In one implementation, the tactile feedback module 1524 is capable of causing movement and/or vibration of the HMD 102 so as to provide tactile feedback to the user.

LEDs 1526 are provided as visual indicators of statuses of the HMD 102. For example, an LED may indicate battery level, power on, etc. A card reader 1528 is provided to enable the HMD 102 to read and write information to and from a memory card. A USB interface 1530 is included as one example of an interface for enabling connection of peripheral devices, or connection to other devices, such as other portable devices, computers, etc. In various implementations of the HMD 102, any of various kinds of interfaces may be included to enable greater connectivity of the HMD 102.

A WiFi/cellular module 1532 is included for enabling connection to the Internet or a local area network via wireless networking technologies such as WiFi or cellular (e.g., 4G, 5G, etc.) or other wireless networking technologies. Also, the HMD 102 includes a Bluetooth module 1534 for enabling wireless connection to other devices. A communications link 1536 may also be included for connection to other devices. In one implementation, the communications link 1536 utilizes infrared transmission for wireless communication. In other implementations, the communications link 1536 may utilize any of various wireless or wired transmission protocols for communication with other devices.

Input buttons/sensors 1538 are included to provide an input interface for the user. Any of various kinds of input interfaces may be included, such as buttons, touchpad, joystick, trackball, etc. An ultra-sonic communication module 1540 may be included in HMD 102 for facilitating communication with other devices via ultra-sonic technologies.

Bio-sensors 1542 are included to enable detection of physiological data from a user. In one implementation, the bio-sensors 1542 can include one or more dry electrodes for detecting bio-electric signals of the user through the user's skin.

A video input 1544 is configured to receive a video signal from a primary processing computer (e.g. portable game console) for rendering on the HMD. In some implementations, the video input is an HDMI input.

The foregoing components of HMD 102 have been described as merely exemplary components that may be included in HMD 102. In various implementations of the disclosure, the HMD 102 may or may not include some of the various aforementioned components. Implementations of the HMD 102 may additionally include other components not presently described, but known in the art, for purposes of facilitating aspects of the present disclosure as herein described.

Figure 6:
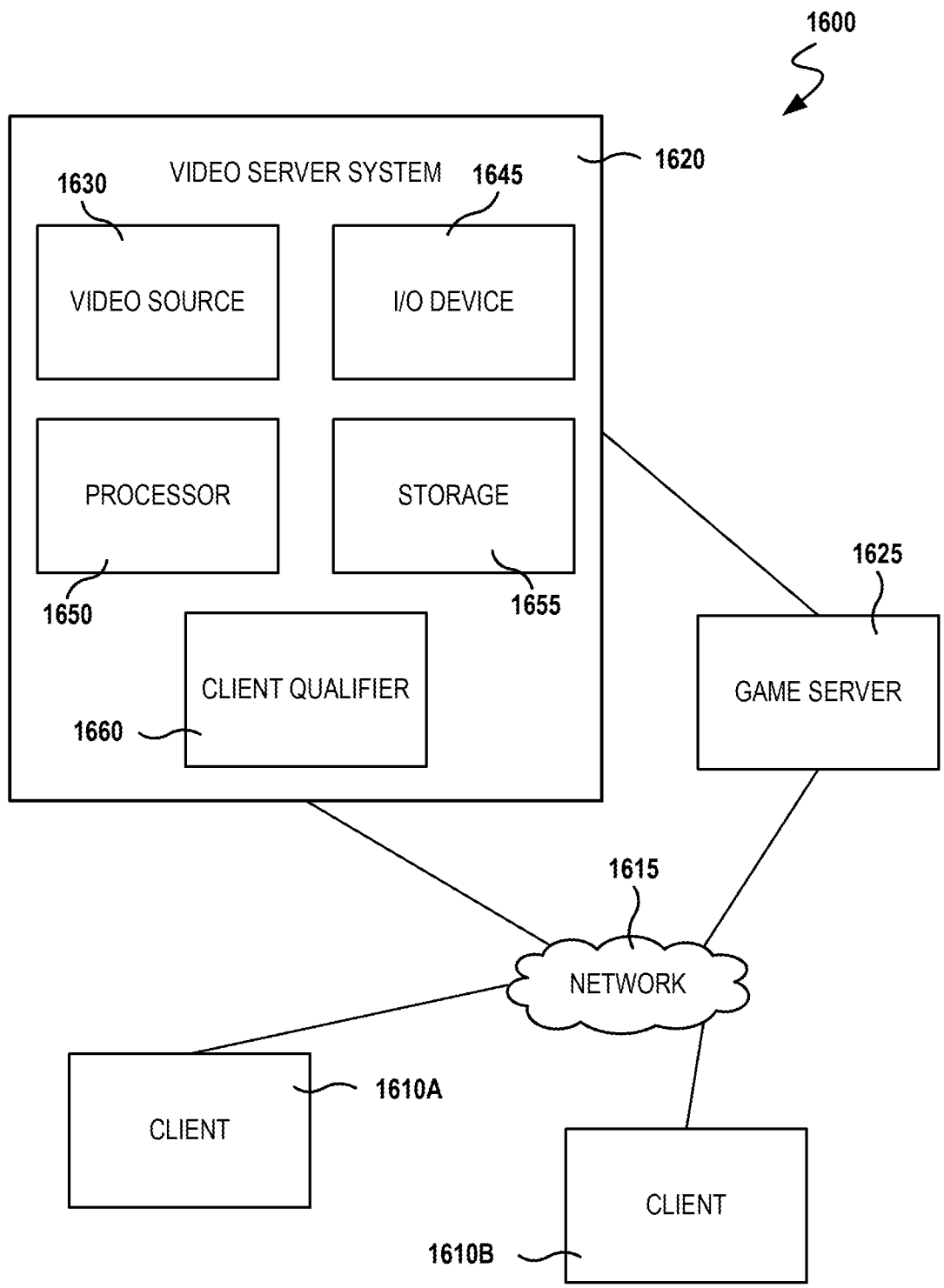
FIG. 6 is a block diagram of a Game System, according to various implementations of the disclosure.

FIG. 6 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include HMDs, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD/MR headset may cooperate with the video server system 1620 to deliver a game viewed through the HMD/MR headset. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command. Game commands are optionally communicated from Client 1610A through a different route or communication channel than that used to provide audio or video streams to Client 1610A.

Game Server 1625 is optionally operated by a different entity than Video Server System 1620. For example, Game Server 1625 may be operated by the publisher of a multiplayer game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD/MR headset that includes a browser. In another implementation, client 1610A is a game console having a browser, which may be displayed on the HMD/MR headset. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, optical media, non-optical data storage devices, etc. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method, comprising:
   rendering a view of a virtual environment through a virtual reality (VR) headset;
   using a camera in the VR headset to detect a gaze direction and a gaze focus depth of a user that wears the VR headset;
   using an EEG sensor in the VR headset to detect an electroencephalography (EEG) signal of the user that wears the VR headset;
   using the gaze direction and gaze focus depth of the user to identify a virtual object in the virtual environment as being actively viewed by the user;
   using the EEG signal to determine a concentration of the user upon the identified virtual object;
   responsive to determining the concentration of the user upon the identified virtual object, then rendering a graphical indicator applied to the virtual object in the view of the virtual environments;
   receiving controller input from a controller device held by the user, and, further responsive to determining the concentration of the user upon the identified virtual object, then applying said controller input to effect a movement of the identified virtual object in the virtual environment.

2. The method of claim 1, wherein using the EEG signal to determine the concentration of the user includes applying a trained machine learning model to recognize the EEG signal, the trained machine learning model being trained using prior EEG signal data of the user.

3. The method of claim 1, wherein the graphical indicator is configured to indicate selection of the identified virtual object.

4. The method of claim 1, wherein the graphical indicator is configured to include a menu of options to be applied to the virtual object.

5. The method of claim 1, further comprising:
   receiving gesture input of the user, and applying said gesture input to effect a change in the virtual object.

6. The method of claim 1, wherein the virtual environment is a virtual environment of a video game, and wherein the virtual object is a virtual object of the video game.

7. A non-transitory computer readable medium having program instructions embodied thereon that, when executed by at least one computing device, cause said at least one computing device to perform a method, said method comprising:
   rendering a view of a virtual environment through a virtual reality (VR) headset;
   using a camera in the VR headset to detect a gaze direction and a gaze focus depth of a user that wears the VR headset;
   using an EEG sensor in the VR headset to detect an electroencephalography (EEG) signal of the user that wears the VR headset;
   using the gaze direction and gaze focus depth of the user to identify a virtual object in the virtual environment as being actively viewed by the user;
   using the EEG signal to determine a concentration of the user upon the identified virtual object;
   responsive to determining the concentration of the user upon the identified virtual object, then rendering a graphical indicator applied to the virtual object in the view of the virtual environment;

receiving controller input from a controller device held by the user, and, further responsive to determining the concentration of the user upon the identified virtual object, then applying said controller input to effect a movement of the identified virtual object in the virtual environment.

8. The non-transitory computer readable medium of claim 7, wherein using the EEG signal to determine the concentration of the user includes applying a trained machine learning model to recognize the EEG signal, the trained machine learning model being trained using prior EEG signal data of the user.

9. The non-transitory computer readable medium of claim 7, wherein the graphical indicator is configured to indicate selection of the identified virtual object.

10. The non-transitory computer readable medium of claim 7, wherein the graphical indicator is configured to include a menu of options to be applied to the virtual object.

11. The non-transitory computer readable medium of claim 7, wherein said method further comprising:
receiving gesture input of the user, and applying said gesture input to effect a change in the virtual object.

12. The non-transitory computer readable medium of claim 7, wherein the virtual environment is a virtual environment of a video game, and wherein the virtual object is a virtual object of the video game.

* * * * *